United States Patent
Byers et al.

(10) Patent No.: US 10,735,271 B2
(45) Date of Patent: Aug. 4, 2020

(54) AUTOMATED AND ADAPTIVE GENERATION OF TEST STIMULI FOR A NETWORK OR SYSTEM

(71) Applicant: Cisco Technology, Inc., San Jose, CA (US)

(72) Inventors: Charles Calvin Byers, Wheaton, IL (US); Joseph Michael Clarke, Raleigh, NC (US); Gonzalo Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 15/829,139

(22) Filed: Dec. 1, 2017

(65) Prior Publication Data

US 2019/0173761 A1    Jun. 6, 2019

(51) Int. Cl.
*H04L 12/24* (2006.01)
*H04L 12/26* (2006.01)

(52) U.S. Cl.
CPC ............ *H04L 41/14* (2013.01); *H04L 41/142* (2013.01); *H04L 43/50* (2013.01); *H04L 41/12* (2013.01); *H04L 41/16* (2013.01); *H04L 43/10* (2013.01)

(58) Field of Classification Search
CPC ......... H04L 41/12; H04L 41/14; H04L 41/16; H04L 41/142; H04L 43/10; H04L 43/50
See application file for complete search history.

(56) References Cited

U.S. PATENT DOCUMENTS

| | | | |
|---|---|---|---|
| 9,064,216 B2 | 6/2015 | Reddy et al. | |
| 9,753,800 B1 | 9/2017 | Jadunandan et al. | |
| 9,787,534 B1* | 10/2017 | Kadosh | H04L 41/069 |
| 10,454,796 B2* | 10/2019 | Wooton | H04L 43/065 |
| 2005/0200809 A1* | 9/2005 | Dreher | B29D 11/00413 |
| | | | 351/246 |
| 2008/0294415 A1* | 11/2008 | de Kleer | G01R 31/318328 |
| | | | 703/19 |

(Continued)

FOREIGN PATENT DOCUMENTS

EP        3139320 A1 *    3/2017    ......... G06F 16/285

OTHER PUBLICATIONS

John Rushby, "Automated Test Generation and Verified Software", Part of the Lecture Notes in Computer Science book series, (LNCS, vol. 4171), Working Conference on Verified Software: Theories, Tools, Experiments, 2005, 9 pages.

(Continued)

*Primary Examiner* — Kostas J Katsikis
(74) *Attorney, Agent, or Firm* — Edell, Shapiro & Finnan, LLC (57) ABSTRACT

Automatic, adaptive stimulus generation includes receiving, at a network device that is associated with a network or system, analytics data that provides an indication of how the network or system is responding to a set of test stimuli introduced into the network or system to facilitate an analysis operation. The network device analyzes the analytics data based on an intended objective for the analysis operation and generates control settings based on the analyzing. The control settings control creation of a subsequent stimulus to be introduced into the network or system during subsequent execution of the analysis operation.

20 Claims, 5 Drawing Sheets

(56) References Cited

U.S. PATENT DOCUMENTS

| | | | |
|---|---|---|---|
| 2008/0294578 A1* | 11/2008 | de Kleer | G06F 11/2257 706/12 |
| 2009/0316587 A1* | 12/2009 | Omar | H04L 43/50 370/245 |
| 2011/0184981 A1* | 7/2011 | Lu | G06F 16/9537 707/774 |
| 2011/0252064 A1* | 10/2011 | Murugappan | G06F 16/487 707/780 |
| 2013/0152047 A1* | 6/2013 | Moorthi | G06F 11/368 717/124 |
| 2013/0182700 A1* | 7/2013 | Figura | H04L 43/04 370/352 |
| 2013/0311977 A1* | 11/2013 | Nieminen | G06F 11/3672 717/135 |
| 2014/0215028 A1 | 7/2014 | Donner et al. | |
| 2015/0347923 A1* | 12/2015 | Bartley | G06F 11/079 706/12 |
| 2015/0382215 A1* | 12/2015 | Huang | H04W 24/08 370/252 |
| 2016/0344693 A1 | 11/2016 | Wetterwald et al. | |
| 2016/0359673 A1* | 12/2016 | Gupta | G06F 3/04842 |
| 2016/0359685 A1* | 12/2016 | Yadav | G06N 7/005 |
| 2016/0359695 A1* | 12/2016 | Yadav | H04L 43/04 |
| 2016/0359886 A1* | 12/2016 | Yadav | H04L 43/062 |
| 2017/0039105 A1* | 2/2017 | Shivanna | G06Q 50/00 |
| 2017/0364352 A1* | 12/2017 | Cmielowski | G06Q 10/06 |
| 2018/0121331 A1* | 5/2018 | Cmielowski | G06F 11/3672 |
| 2018/0145906 A1* | 5/2018 | Yadav | H04L 45/70 |
| 2019/0050534 A1* | 2/2019 | Apte | G16H 70/60 |
| 2019/0051390 A1* | 2/2019 | Shah | G16H 10/60 |
| 2019/0073603 A1* | 3/2019 | Johansson | G06N 5/048 |
| 2019/0089599 A1* | 3/2019 | Savalle | H04L 41/22 |
| 2019/0108263 A1* | 4/2019 | Rouhani-Kalleh | G06F 7/24 |
| 2019/0108283 A1* | 4/2019 | Koolwal | G06F 16/9535 |
| 2019/0109809 A1* | 4/2019 | Wang | G06F 16/285 |
| 2019/0123985 A1* | 4/2019 | Rao | H04L 43/062 |
| 2019/0155572 A1* | 5/2019 | Misra | G06F 7/02 |
| 2019/0173761 A1* | 6/2019 | Byers | H04L 41/14 |
| 2019/0205810 A1* | 7/2019 | Pojar | H04L 41/14 |
| 2019/0320329 A1* | 10/2019 | Godor | H04W 24/08 |

OTHER PUBLICATIONS

Xun Yuan, et al., "Towards Dynamic Adaptive Automated Test Generation for Graphical User Interfaces", International Conference on Software Testing, Verification and Validation Workshops, ICSTW '09, Apr. 1-4, 2009, Denver, CO, 4 pages.

Tommi S. Jaakkola, et al., "Exploiting generative models in discriminative classifiers", Advances in neural information processing 1999, papers.nips.cc, 7 pages.

Ian J. Goodfellow, et al., "Generative Adversarial Nets", Part of: Advances in Neural Information Processing Systems 27 (NIPS 2014), papers.nips.cc, 2014, 9 pages.

Scott Marshall, "CANDID: Classifying Assets in Networks by Determining Importance and Dependencies", Electrical Engineering and Computer Sciences, University of California at Berkeley, Technical Report No. UCB/EECS-2013-64, http://www.eecs.berkeley.edu/Pubs/TechRpts/2013/EECS-2013-64.html, May 15, 2013, 93 pages.

* cited by examiner

AUTOMATED AND ADAPTIVE GENERATION OF TEST STIMULI FOR A NETWORK OR SYSTEM

TECHNICAL FIELD

The present disclosure relates to network and system analysis.

BACKGROUND

When a network, industrial control system, Internet of Things (IoT) deployment, application support infrastructure, or other complex system is being tested for troubleshooting, routine exercise, commissioning, performance verification, security certification, etc., it is often necessary to provide test input. This input could be stimulus in the form of test cases that yield expected results, test data sets to validate performance under load, security challenges, exercises for various corner cases, or abnormal inputs. During testing, the system or network, as well as various systems associated with the system or network, act upon the stimulus and generate a multitude of data outputs (i.e., various data sets, sensor measurements, and observations).

Often, during testing, an analytics system monitors the system's outputs in attempt to determine if the system is performing within prescribed limits. That is, an analytical system may apply various analytical algorithms to the data outputs to correlate and/or organize the data outputs as needed. Recently, machine learning techniques have been applied to these analytical algorithms to allow the algorithms to be continuously tuned over time and to optimize the performance and accuracy of the analytical algorithms. However, analytical techniques, even when applied in combination with machine learning techniques, are purely responsive to network outputs and do not initiate or cause these outputs. Instead, the network or system inputs (i.e., test stimuli) cause a system or network to react or respond in different manners and to produce particular data outputs necessary to complete the test processes.

Consequently, if a network administrator wants to complete different tasks or test a specific aspect or portion of a network (i.e., to test various corner cases, error log entries, loading scenarios, etc.), the administrator needs to generate new inputs (i.e., new test stimuli) that are suitable for the new task and/or for stimulating the specific aspect or portion of the system or network. Unfortunately, generating test stimuli is a laborious task and, thus, even if the analytical techniques are relatively efficient and automated in and of themselves, it may be inefficient to utilize these analytical techniques at least because generating the stimuli to, in essence, activate these analytical techniques is an inefficient process, in terms of both time and cost. In fact, often, the system or network under test has evolved (i.e., changed in terms of users, applications, nodes, etc. to the point that test stimuli are obsolete) before new stimuli can be generated for a new test. That is, user-generated stimuli may react poorly to rapidly evolving systems and network.

DESCRIPTION OF EXAMPLE EMBODIMENTS

Overview

Techniques are presented herein for automatically and adaptively generating test stimulus for a network or system. These techniques may be embodied as a method, an apparatus, a system, and instructions in a computer-readable storage media to perform the method.

According to at least one example embodiment, automatic, adaptive stimulus generation includes receiving, at a network device that is associated with a network or system, analytics data that provides an indication of how the network or system is responding to a set of test stimuli introduced into the network or system to facilitate an analysis operation. The network device analyzes the analytics data based on an intended objective for the analysis operation and generates control settings based on the analyzing. The control settings control creation of a subsequent stimulus to be introduced into the network or system during subsequent execution of the analysis operation.

Example Embodiments

Presented herein are techniques for automatically and adaptively generating test stimuli for testing a network or system. These techniques, which are also referred to herein as "stimulitics" techniques, develop sophisticated and dynamic sets of test stimuli for use in various network or system analysis operations (i.e., troubleshooting, routine exercise, commissioning, performance verification, security certification, etc.). The sets of stimuli are sophisticated and dynamic at least because the sets of stimuli are generated based on feedback from various analytical systems or functions being implemented in connection with the system or network. In fact, in at least some instances, the stimulitics techniques may generate real-time test stimuli based on real-time feedback from analytical systems or functions, as well as machine learning techniques associated with the analytical systems or functions.

More specifically, the stimulitics techniques presented herein work with traditional network analytics systems or functions to create a closed loop of stimuli generation and network analysis. Consequently, the stimulitics techniques can continually and automatically create stimuli (or cause stimuli to be created) and the stimuli may be tuned, over time, to adjust or adapt to network conditions identified by analytical techniques (i.e., changing response sets) and/or to provide focused or deeper testing of new or different issues identified by the analytical techniques (i.e., changing test needs). That is, the closed loop allows the stimuli to be continually improved so that sophisticated test stimuli can be generated and played into a system or network to stimulate the system or network in various, specific ways. For example, the closed loop may efficiently and effectively generate test stimuli to exercise a system's various corner cases, error logs, security threats, and loading scenarios. Consequently, the stimulitics techniques presented herein may vastly improve the efficiency and effectiveness of stimuli generation which, in turn, may vastly improve the testing of a network or system (i.e., for troubleshooting, routine exercise, commissioning, performance verification, security certification, etc.), thereby vastly improving the underlying system or network itself.

By comparison, without the stimulitics techniques presented herein, a testing system may be inadequate for analyzing the spontaneous responses of systems. For example, manually created stimuli are laborious to create, lack complete test coverage, and cannot dynamically react to changing system conditions or use pattern. In fact, in some instances, a network may evolve to such a degree before the manually created stimuli are ready to be introduced into the system that the laboriously created stimuli may be inappropriate for current network conditions. Alternatively, in some instances, automation test creation techniques may be available; however, these techniques are typically unconnected to analytical techniques (i.e., there is no closed loop) and, thus, these techniques cannot respond to changing network conditions or response sets. Moreover, these techniques cannot automatically refine test stimuli based on real-time testing. The system-wide connections between behavioral analytics and adaptive, automatic test stimulus generation provided herein vastly improves upon these techniques and, thus, improves an underlying network or system formed or tested in accordance without the techniques presented herein.

Figure 1:
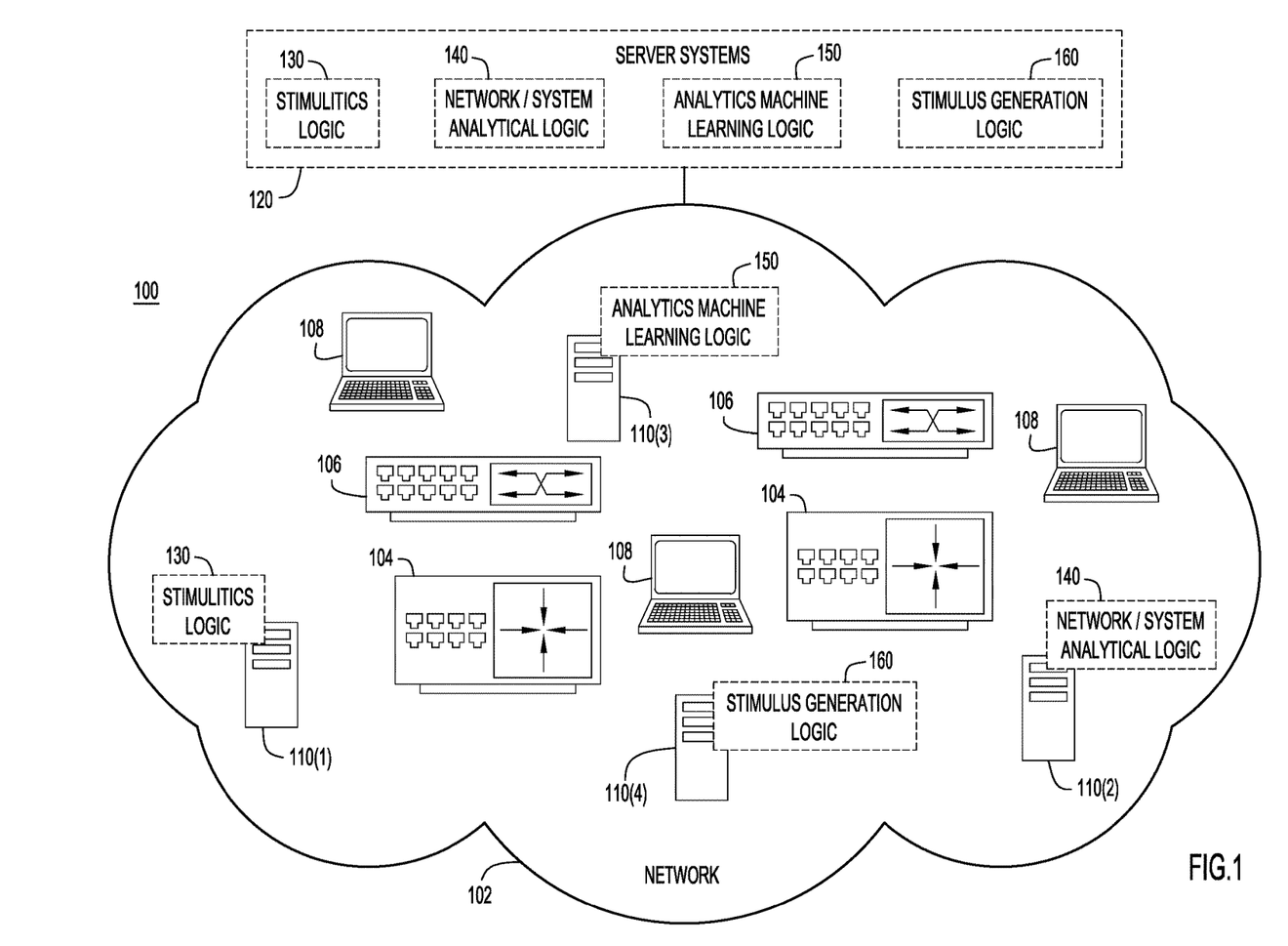
FIG. 1 is a diagram illustrating a networking environment in which the techniques presented herein may be employed, according to an example embodiment.

Reference is first made to FIG. 1 for a description of a network environment 100 in which the techniques presented herein may be employed, according to at least one example embodiment. The network environment 100 includes a network 102 that is formed by a plurality of network devices and may also include server systems 120 that are external to the network 102, but operatively coupled to the plurality of network devices in the network 102. An example network element that may be representative of any of the network devices in the network 102 or the server systems 120 is described in further detail below in connection with FIG. 5. In FIG. 1, the network 102 is represented by routers 104, switches 106, endpoint devices 108, and servers 110(1)-110(4). However, in other embodiments, the network 102 may include any combination of these and other elements, such as gateways, optical transport engines, firewalls, access points, fog nodes, Internet of Things (IoT) devices, etc. Meanwhile, the server systems 120 are depicted in dashed lines because, in some embodiments, the stimulitics techniques presented herein may be performed entirely or partially within the network 102 and, thus, external server systems 120 may host some or none of the logic associated with the stimulitics techniques presented herein.

More specifically, at least some network devices in the plurality of network devices in the network 102 and/or the external server systems 120 include memory on which stimulitics logic 130, network/system analytical logic 140, analytics machine learning logic 150, and stimulus generation logic 160 reside. Collectively, these logic elements cause sets of adaptive and intelligent test stimuli to be automatically generated and introduced into a network or system under test (i.e., network 102 or a particular network device included therein).

For example, the network/system analytical logic 140 may include executable instructions for gathering and analyzing system outputs from a network or system under test (i.e., network 102 or a particular subset of network devices residing therein) and analytics machine learning logic 150 may include executable instructions for applying machine learning techniques to the analytical techniques implemented by executing network/system analytical logic 140. Meanwhile, the stimulitics logic 130 may include instructions that, when executed, generate control settings based on feedback from the analytic-based logic (i.e., network/system analytical logic 140 and analytics machine learning logic 150). Moreover, the stimulitics logic 130 may include executable instructions that work with the stimulus generation logic 160 to generate stimuli based on the control settings and to introduce the stimuli into the network or system under test (i.e., network 102). Then, over time, the analytic-based logic (i.e., network/system analytical logic 140 and analytics machine learning logic 150) may analyze data output by the network or system under test in response to the stimuli and provide feedback so that stimulitics logic 130 can continually adjust or adapt the stimuli produced by stimulus generation logic 160 for a particular test scenario and/or particular conditions present in the network or system under test.

To facilitate the aforementioned operations, any devices hosting one or more of the depicted logic elements are operatively coupled together to allow data (i.e., feedback and/or control settings) to be exchanged between the logic elements. For example, in some embodiments, the stimulitics logic 130, the network/system analytical logic 140, the analytics machine learning logic 150, and the stimulus generation logic 160 may all reside on a single network device that is external to the network 102 (i.e., server system 120) or a distributed system that is external to the network 102 (i.e., server system 120, but with a different architecture). Alternatively, one or more of the stimulitics logic 130, the network/system analytical logic 140, the analytics machine learning logic 150, and the stimulus generation logic 160 may reside on one or more network devices within the network 102 that are operatively coupled together.

More specifically, in one example, the stimulitics techniques may be performed entirely within the server systems 120, which may comprise a single server or a series of distributed servers, for example cloud servers, and, thus, the stimulitics logic 130, the network/system analytical logic 140, the analytics machine learning logic 150, and the stimulus generation logic 160 may all reside on the server systems 120. That is, each of these pieces of logic may reside within memory of one or more servers in the server systems 120. By contrast, in other embodiments, one or more of the stimulitics logic 130, the network/system analytical logic 140, the analytics machine learning logic 150, and the stimulus generation logic 160 may reside on memory of one or more devices within the network. For example, the stimulitics logic 130 may reside in memory of a first server 110(1) disposed in network 102, the network/system analytical logic 140 may reside in memory of a second server 110(2), the analytics machine learning logic 150 may reside in memory of a third server 110(3), and/or the stimulus generation logic 160 may reside in memory of a fourth server 110(4). In yet other embodiments, some of the logic elements (i.e., stimulitics logic 130) may reside within memory of one or more servers in the server systems 120 and the remaining logic elements (i.e., network/system analytical logic 140, analytics machine learning logic 150, and stimulus generation logic 160) may reside within memory of one or more network devices within the network 102.

Still referring to FIG. 1, although not shown, in still further embodiments, the stimulitics logic 130, network/system analytical logic 140, analytics machine learning logic 150, and stimulus generation logic 160 may reside and operate on one or more network devices or systems. For example, the stimulitics logic 130, network/system analytical logic 140, analytics machine learning logic 150, and stimulus generation logic 160 may all reside on the memory of a single server system and may be configured to create a closed-loop of analytical techniques and stimulus generation for the single server system. In yet other embodiments, some of the stimulitics logic 130, the network/system analytical logic 140, the analytics machine learning logic 150, and the stimulus generation logic 160 could operate in unused computational resources on network elements, such as router 104. Consequently, the techniques presented herein may be described as automatically and adaptively generating test stimuli for testing a network or one or more systems. That being said, regardless of the particular architecture or deployment of the various logic elements, the logic elements are all operatively coupled together to allow the logic elements to communicate with each other, as is explained in further detail below in connection with FIG. 2.

Figure 2:
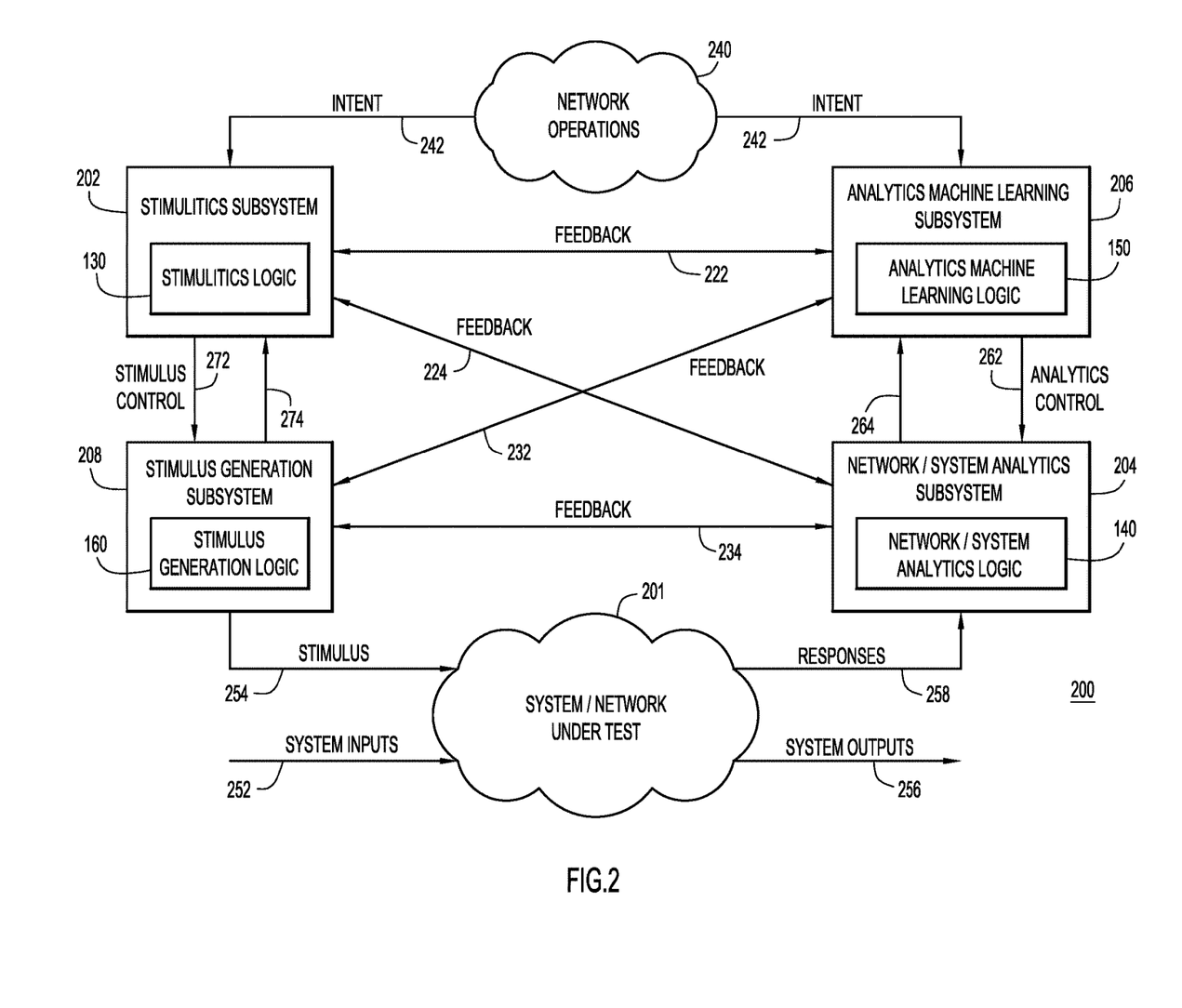
FIG. 2 is a diagram depicting operations for automatically and adaptively generating test stimulus for a network or system, according to an example embodiment.

Referring next to FIG. 2 for a description of a diagram 200 depicting operations performed by one or more network devices to automatically and adaptively generate test stimuli for a network or system. Reference is also made to FIG. 1 for the purposes of the description of FIG. 2 and like labels are used for similar components in both Figures. Specifically, the stimulitics logic 130, the network/system analytical logic 140, the analytics machine learning logic 150, and the stimulus generation logic 160 from FIG. 1 are illustrated in FIG. 2; however, in FIG. 2 these elements are in subsystems (e.g., in stimulitics subsystem 202, network/system analytical subsystem 204, analytics machine learning subsystem 206, and stimulus generation subsystem 208, respectively). This depiction is not intended to limit the manner in which the techniques presented herein may be implemented, but instead, is simply intended to signify that, in FIG. 2, the various logic elements from FIG. 1 (i.e., the stimulitics logic 130, network/system analytical logic 140, analytics machine learning logic 150, and stimulus generation logic 160) each may be implemented on a network device (and, thus, referred to as a subsystem). That is, despite the depiction illustrated in FIG. 2, the logic elements need not be implemented on separate network devices. However, at the same time, the logic elements need not be implemented on a single network device. Instead, the various logic elements (i.e., the stimulitics logic 130, network/system analytical logic 140, analytics machine learning logic 150, and stimulus generation logic 160) may be implemented in accordance with at least the implementations discussed above in connection with FIG. 1.

That being said, in FIG. 2, there are several sets of cross couplings between the various subsystems that create closed-loops between the subsystems and the network/system under test 201 (which should be understood to represent any network or system, such as network 102 shown in FIG. 1 or one or more of the endpoint devices 108, routers 104, servers 110(1)-(4), etc. included therein). Initially, both the stimulus-related subsystems (stimulitics subsystem 202 and stimulus generation subsystem 208) are in communication with both of the analytics subsystems (network/system analytical subsystem 204 and analytics machine learning subsystem 206). More specifically, a feedback path 222 allows data to be transmitted back and forth between the stimulitics subsystem 202 and the analytics machine learning subsystem 206 while a feedback path 224 allows data to be transmitted back and forth between the stimulitics subsystem 202 and the network/system analytical subsystem 204.

Additionally, a feedback path 232 allows data to be transmitted back and forth between the stimulus generation subsystem 208 and the analytics machine learning subsystem 206 while a feedback path 234 allows data to be transmitted back and forth between the stimulus generation subsystem 208 and the network/system analytical subsystem 204. This cross-coupling allows various data relating to the network/system under test 201 to flow between the various subsystems. For example, information relating to trigger events, coverage estimates, data set statistics, efficiency estimates, performance measurements, security parameters, root cause estimates, and a host of other statistics involved in the closed loop test system may flow bidirectionally across feedback paths 222, 224, 232, and 234.

Additionally, the stimulitics system 202 and the analytics machine learning subsystem 206 are each in communication with network operations 240. The network operations 240 is representative of higher level network operations automation systems and/or users (i.e., administrators) in charge of running the network. Consequently, intent arrows 242 running from the network operations 240 to the stimulitics system 202 and the analytics machine learning subsystem 206 may represent processes in which high-level network operations automation systems and/or users supply the stimulitics system 202 and the analytics machine learning subsystem 206 with initial, high-level descriptions of the networks, applications, types of tests to be run against/on the network, operational goals, threat descriptions, and/or types of conditions to look for in the network (which the stimulitics system 202 and the analytics machine learning subsystem 206 may subsequently verify, update, etc.). This intent could be communicated in various high level network description formats, natural language, expert systems, machine generated inputs (simulation results, logs, measurements, etc.) or high level architectural descriptions.

Due to the above-described connections, the stimulitics system 202 and the analytics machine learning subsystem 206 can each adapt their analysis techniques to feedback relating to the network or system under test 201 as well as changing intent from a network administrator (i.e., if an administrator wants to switch from troubleshooting operations to commissioning operations). More specifically, the stimulitics system 202 and the analytics machine learning subsystem 206 each employ machine learning techniques and the cross coupling may allow the machine learning techniques to continually adapt stimulitics and analytical techniques to each other as well as the network or system under test.

For example, the cross-coupling allows the machine learning techniques employed by the stimulitics system 202 to continually adapt the stimuli being introduced into the system to evolving conditions the network or system under test 201. Meanwhile, the machine learning techniques employed by the analytics machine learning subsystem 206 may adapt its analytical techniques in view of the adapting stimuli (i.e., to monitor for results based on the new stimuli). The machine learning techniques may also adapt their stimulitics and analytical techniques based on input received from network operations 240. In terms of data features, the stimulitics system 202 (as well as the analytics machine learning subsystem 206) may use various machine learning capabilities like classification, clustering, reinforcement, etc. to train and continuously optimize stimuli generation (or analytical tests), as well as various contexts, like past history of the system/network under test, history of similar systems, databases of tests and responses, and various rules and heuristics.

As a more specific example, during operation, the system/network under test 201 receives system inputs 252 and/or test stimuli 254. In response to the system inputs 252 and/or test stimuli 254, the system/network under test 201 reacts by processing the inputs 252 and/or test stimuli 254 and produces system outputs 256. The network/system analytics subsystem 204, based on instructions from the network/system analytics logic 140, monitors and gathers data 258 that is representative of how the system/network under test 201 reacted to produce the system outputs 256 and/or the outputs 256 themselves (in fact, in some embodiments, the data 258 may be the same or substantially similar to the outputs 256). Moreover, as the network/system analytics subsystem 204 gathers and processes data 258, the network/system analytics subsystem may work with the analytics machine learning subsystem 206 to understand the data 258. More specifically, the network/system analytics subsystem 204 may provide the analytics machine learning subsystem 206 with information about the gathered data at 264 and the analytics machine learning subsystem 206 may use machine learning techniques to generate analytics controls based on this information. Then, at 262 the analytics machine learning subsystem 206 may send analytics controls to the network/system analytics subsystem 204. For example, the analytics controls sent at 262 may train the network/system analytics subsystem 204 and/or provide the network/system analytics subsystem 204 with algorithms that allow the network/system analytics subsystem 204 to generate more relevant knowledge based on the data 258 received from the system/network under test 201.

As the network/system analytics subsystem 204 and analytics machine learning subsystem 206 work in tandem to generate knowledge information about the system/network under test 201, each of these subsystems may provide feedback to the stimulitics system 202 and the stimulus generation subsystem 208 (along feedback paths 222, 224, 232, and 234). In response to this feedback, the stimulus generation subsystem 208, based on instructions from the stimulus generation logic 160, may begin to generate test stimuli for the system/network under test 201. For example, the stimulus generation subsystem 208 may begin to prepare serial scan systems, very large scale integration (VLSI) tests, code coverage and analysis tests, scripted automation testing for load testing, security threat assessment tests, etc. Meanwhile, the stimulitics system 202 will employ machine learning techniques to determine, based on the feedback from the network/system analytics subsystem 204 and analytics machine learning subsystem 206, as well as the intent 242, how to refine or improve the test stimuli generated by the stimulus generation subsystem 208. Alternatively, stimulitics system 202 may generate or specify at a high level a test or series of tests for the stimulus generation subsystem 208 to generate before any test stimuli is introduced into the system/network under test 201.

Regardless of the exact order of operations, as the stimulitics system 202 determines how to configure the test stimuli, the stimulitics system 202 sends control settings to the stimulus generation subsystem 208 along control path 272. Meanwhile, the stimulus generation subsystem 208 provides feedback, along feedback path 274, so that the stimulitics system 202 remains informed of the test stimuli being generated by the stimulus generation subsystem 208, how efficiently stimulus 254 is being supplied to system/network under test 201, and the limitations of the stimulus generation subsystem 208.

As a more concrete example, if the stimulus generation subsystem 208 is generating test stimuli in the form of network traffic in attempt to fully saturate a network under test (i.e., the intent 424 indicates or the machine learning techniques determine that the network should be tested to full saturation), the machine learning techniques employed by the stimulitics system 202 may determine, based on historical records for similar networks and machine learning classification and clustering, the amount of traffic that should be introduced into the network, the size of the packets that should be introduced, and/or arrival times for the various packets. However, based on feedback from the stimulus generation subsystem 208 via link 274, the stimulitics system 202 may also determine that the stimulus generation subsystem 208 can only introduce traffic into the network under test at a rate of 10 GB/s and, thus, may ensure the test stimuli meet this limitation (or reconfigure the test stimuli accordingly). Then, over time, the stimulitics system 202 may continually tune its control settings over link 272 based on real-time feedback (which, in turn, continually tune the stimuli being introduced into the network) to carefully balance and prioritize the generation of stimuli in view of real-time network conditions. For example, the stimulitics subsystem 202 may analyze feedback from the network/system analytics subsystem 204 and analytics machine learning subsystem 206 to determine if the traffic needs to be increased or decreased to efficiently achieve full saturation.

Additionally or alternatively, if new test requirements suddenly arrive (for example, due to a new security threat, change in network configuration, new applications, changing loads, or tightened performance requirements and/or the network operations system provides updated intent commands), the stimulitics subsystem 202 interacts with the analytics machine learning subsystem 206 to automatically create a new set of test stimuli and expected responses that will cover the new scenarios. In its learning phase, the stimulitics subsystem 202 will notice which test requirements are unmet (perhaps by using techniques like coverage analysis or by consulting root causes of error cases that were not discovered by the analytics machine learning subsystem 206 and network/system analytics subsystem 204 due to inadequate stimulus), and automatically enhance the test sets in near real-time. The stimulitics subsystem 202 can also recommend changes to the topology of the stimulus generation subsystem 208, network/system analytics subsystems, or the system/network under test 201, in order to more efficiently perform difficult test scenarios, such as load generation or distributed security threat simulation. Advantageously, the tuning of test stimulus via the process described above is largely automatic, and can therefore respond quite rapidly.

Still referring to FIG. 2, generally, the stimulitics subsystem 202 and the analytics machine learning subsystem 206 cooperate to translate intent 242 into actionable control settings that are sent to the network/system analytics subsystem 204 and stimulus generation subsystem 208 to implement closed loop test scenarios. The rich cross-coupling between all of these systems provides the machine learning techniques employed by the stimulitics subsystem 202 and the analytics machine learning subsystem 206 with enough information to quickly and easily adapt test stimuli to changing intent and/or changing system/network conditions. Additionally or alternatively, the machine learning techniques employed by the stimulitics subsystem 202 allow the stimulitics subsystem 202 to prioritize test stimuli to introduce into a network, as is explained in further detail below in connection with FIG. 3.

In at least the network context, adaptive and prioritized stimuli may be particularly valuable since modern networks are constantly evolving in terms of users, nodes, security threats, applications, performance challenges, etc. and, thus, it is nearly impossible to manually update stimuli to keep pace with network configurations. As a more specific example, in IoT network deployments, especially complex IoT networks, such as a smart cities deployment, the adaptive and prioritized stimuli may be especially useful. This is because IoT networks may require numerous test cases looking at connectivity, load, security, etc., and the scale, variability, and complexity, which makes unautomated generation of test cases inefficient and difficult, if not impossible. In fact, the adaptive and prioritized stimuli generated with the techniques presented herein would not only improve the efficiency and ease with which stimuli can be generated for such a deployment, but the adaptive and prioritized stimuli would also improve the underlying network, since the closed loop involving the adaptive and prioritized stimuli would quickly and automatically identify, isolate, and comprehensively test (or re-test) any issues or potential issues within a network, even a network as large, complex, and variable/unpredictable as a large scale IoT deployment.

Figure 3:
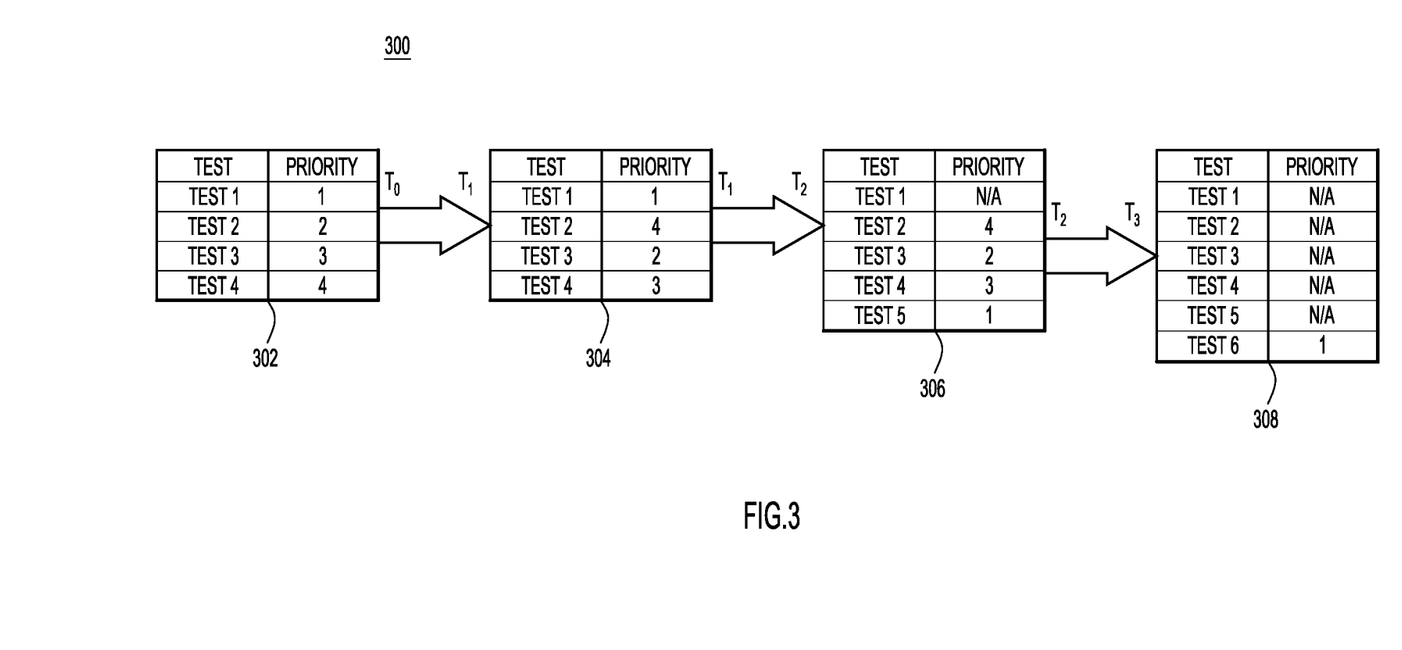
FIG. 3 is a diagram depicting automatic and continual tuning of test stimuli generated in accordance with the techniques presented herein, according to an example embodiment.

Now referring to FIG. 3 for a description of a diagram 300 depicting the adaptive nature of test stimuli generated in accordance with the techniques presented herein. Reference is also made to FIGS. 1 and 2 for purposes of the description of FIG. 3. Generally, diagram 300 illustrates how the stimulitics techniques presented herein can prioritize test cases based on known business impact of previous problems. In the modern landscape of quickly and ever evolving computing and networking environments, this prioritization may be especially valuable both during deployment of a greenfield network and while monitoring operations of a network. In either scenario (i.e., testing a greenfield network or an existing network), it may not be possible to test every aspect of the network and, instead, it may be best to prioritize test cases designed to detect problems that are most likely to cause costly, service-impacting outages to run first while other tests are scheduled to run at opportunistic times. Additionally or alternatively, tests for routine exercise of existing networks may be prioritized (i.e., by stimulitics subsystem 202) to emphasize test scenarios that will catch the most likely failure or overload scenarios. Ultimately, this leads to faster deployment and/or increased quality assurance in systems and/or networks, and better quality of experience for their users.

To illustrate this prioritization, FIG. 3 depicts priority rankings for network tests generated by the stimulitics subsystem 202 based on intent received from network operations 240. Initially, at 302, the stimulitics subsystem 202 determines (i.e., based on the known business impact of previous problems) that tests 1-4 should be run incrementally and, thus, assigns priority 1 to test 1, priority 2 to test 2, priority 3 to test 3, and priority 4 to test 4 at time $T_0$. As a more concrete example, if a network is experiencing interface errors, the errors might be picked up by the network/system analytics system 204. Then, the stimulitics subsystem 202 might determine, based on historical records and similar errors seen in different deployments that tests 1-4 should be run incrementally. Additionally, the stimulitics subsystem 202 and/or stimulus generation subsystem 208 may send feedback to the network/system analytic subsystem 204 to inform the network/system analytic subsystem 204 that it is about to launch a new suite of tests, thereby alerting the network/system analytic subsystem 204 to watch for the network's response to the new suite of tests. In other words, the stimulitics subsystem 202 may send data along feedback paths 224 and 234 to ensure that the stimulus generation subsystem 208 and network/system analytics subsystem 204 are synchronized.

Then, over time, the stimulitics subsystem 202 receives feedback from the system or network under test 201 (via the network/system analytics system 204 and analytics machine learning subsystem 206, which are working in concert to monitor the network under test for a response to the tests) and the machine learning techniques constantly reevaluate the priority list. If, for example, the network/system analytics system 204, while working in combination with analytics machine learning subsystem 206, are unable to isolate the error from time $T_0$ to time $T_1$ (i.e., if the errors were propagating downstream from their sources through a data center network and preventing isolation of the error with tests 1-4), the stimulitics subsystem 202 may recognize that the error has yet to be isolated and may begin to reprioritize the tests at time $T_1$. In particular, stimulitics subsystem 202 may reassign priority 2 to test 3, priority 3 to test 4 and priority 4 to test 2, as is shown at 304. The stimulitics subsystem 202 may then transmit the updated priorities to the stimulus generation subsystem 208 and the network/system analytic subsystem 204 so that new stimulus packets may be launched, the network can respond, and the analytics subsystem can obtain data indicative of the network's response.

If the re-organized priority list illustrated at 304 identifies or isolates a root cause of the error, the stimulitics subsystem 202 can begin to focus on or look for a new issue (as shown at 308 and discussed below). Otherwise, the stimulitics subsystem 202 can begin to dig deeper in its training database to develop new priorities or new tests. For example, the stimulitics subsystem 202 may generate a new test when it determines that the error is not yet been isolated. This is illustrated at 306, where new test 5 is replaces test 1 in the priority list (and takes priority 1) at time $T_2$. Expanding on the same example from above, the stimulitics subsystem 202 may take this action when, at time $T_2$, the stimulitics subsystem 202 makes an inference, based on various machine learning classifications, that faulty switches may be creating the error and propagating the errors downstream. In response to this inference, the stimulitics subsystem 202 may generate control settings (i.e., test 5) that cause the stimulus generation subsystem 208 to test this specific inference. That is, the allegedly causal switches would be selected from a list of many possible issues, and classified as the highest priority when the stimulitics subsystem 202 determines that the switches have the best chance of being a true root cause. Then, the stimulitics subsystem 202 would send commands to the stimulus generation subsystem 208, which would create test packets and inject them at appropriate places in the network.

If the switches are isolated as the root cause of the error time $T_2$, the stimulitics subsystem 202 may alert network operations 240 and may then move on to address a new issue or task. For example, and as is shown at 308, at time $T_3$, tests 1-5 may be replaced with test 6. If, instead, the switches were identified at time $T_1$ the stimulitics subsystem 202 would need not develop the list of tests shown at 306 and could skip directly from generating control settings in accordance with the list shown at 304 to generating control settings in accordance with the list shown at 308. That is, once the stimulitics subsystem 202 isolates an error, the stimulitics subsystem 202 may move on to address a new issue or task (i.e., based on the known business impact of previous problems). This could save significant network resources.

By comparison, without stimulitics subsystem 202, an enterprise may need to slowly remove components or functions from its network or system and/or create stimuli from scratch to attempt the root cause of the problem. As mentioned, generating stimuli is an extremely laborious task, especially for an evolving or shifting computer environment, and removing components (i.e., cables) may create additional issues for the networks, such as limiting capacity, without necessarily identifying the root cause of the problem. Moreover, removing components or functions from a network and/or creating stimuli may take months, while the closed-loop system provided herein might resolve the issue in a matter of second or minutes (i.e., times $T_0$, $T_1$, $T_2$, $T_3$ may cover intervals spanning a few minutes or less), saving hours or even days in troubleshooting complex systems or networks. That is, the techniques presented herein may improve an underlying network in a timely and efficient manner as compared to traditional troubleshooting methods, even those utilizing analytics techniques in combination with machine learning techniques. Also, specifically related to security threats, these techniques could respond to rapidly changing security landscapes on timescales that can generate the required test stimulus and identify security problems before they become major network issues.

Figure 4:
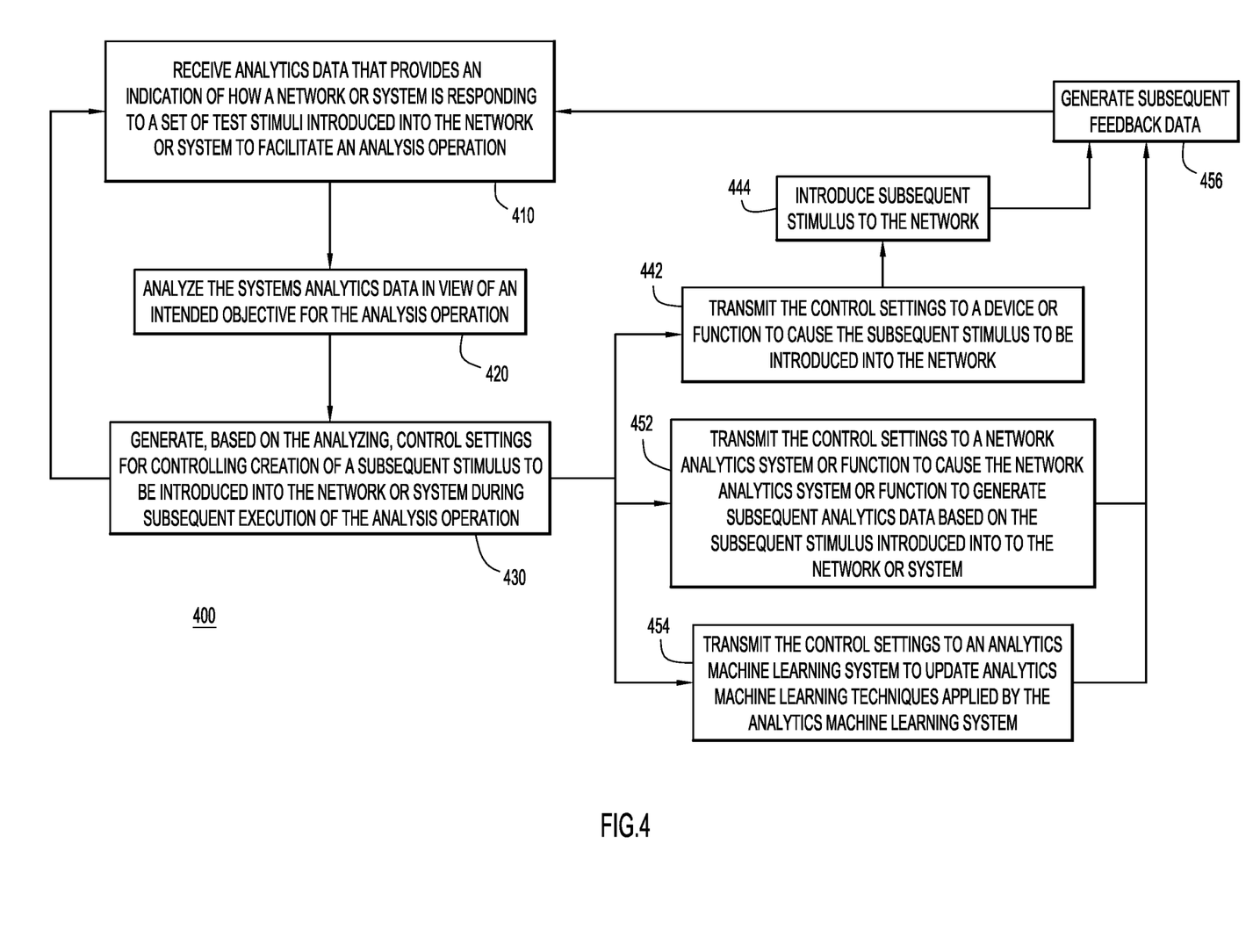
FIG. 4 is a high-level flowchart illustrating a method for automatically and adaptively generating test stimuli for a network or system, according to an example embodiment.

Referring next to FIG. 4 for a description of a high-level flow chart of a method 400 depicting operations performed by one or more network devices when executing the stimulitics logic, to automatically and adaptively generate test stimulus for a network or system. Reference is also made to FIGS. 1 and 2 for the purposes of the description of FIG. 4. Moreover, for simplicity, the operations depicted in FIG. 4 are described as being executed by one of the subsystems from FIG. 2 (i.e., the stimulitics subsystem 202), but it is to be understood that the operations could be executed by one or more network devices.

That being said, at 410, the stimulitics subsystem 202 receives systems analytics data that provides an indication of how a network or system is responding to a set of test stimuli introduced into the network or system to facilitate an analysis operation. For example, the stimulitics subsystem 202 receives feedback from the network/system analytics subsystem 204 and analytics machine learning subsystem 206 along feedback paths 222, 224, 232, and 234. That is, the stimulitics subsystem 202 may receive feedback in response to a first set of stimuli being introduced into the network based on a first set of control settings generated by the stimulitics subsystem 202.

At 420, the stimulitics subsystem 202 analyzes the systems analytics data based on an intended objective for the analysis operations. For example, the stimulitics subsystem 202 may employ machine learning techniques to analyze the feedback received from the network/system analytics subsystem 204 and/or analytics machine learning subsystem 206. At 430, the stimulitics subsystem 202 generates control settings based on the analyzing. The control settings control creation of a subsequent stimulus to be introduced into the network or system during subsequent execution of the analysis operation and may designate priorities for different tests that the stimulus generation subsystem may convert into test stimuli that are introduced into the network. Consequently, in at least some embodiments, the stimulitics subsystem 202 transmits the control settings to a device or function (i.e., stimulus generation subsystem 208) to cause the subsequent stimulus to be introduced into the network, as illustrated at 442. The transmission at 442 may cause the device or function to introduce the subsequent stimulus into the network at 444.

Additionally or alternatively, after the stimulitics subsystem 202 generates control settings based on the analyzing at 420, the stimulitics subsystem 202 may, at 452, transmit the control settings to a network analytics system or function (i.e., the network/system analytics system 204) to cause the network analytics system or function to generate subsequent systems analytics data based on the subsequent stimulus introduced into to the network. Concurrently, the stimulitics subsystem 202 may, at 454, transmit the control settings to an analytics machine learning system (i.e., analytics machine learning subsystem 206) to update analytics machine learning techniques applied by the analytics machine learning system. The transmissions occurring at 452 and 454 may, in turn, cause the network analytics system or function and the analytics machine learning system to generate subsequent feedback data at 456, which can influence subsequent iterations of process 400.

The feedback data generated at 456 may be indicative of the network's response to the subsequent stimulus introduced the network data at 444 and may be sent (i.e., from the network/system analytics system 204 and/or the analytics machine learning subsystem 206) to the stimulitics subsystem 202 to create a closed loop and allow the stimulitics subsystem 202 to continually refine, adapt its control settings in view of evolving network configurations or changing objectives. That is, method 400 may completely automate a closed-loop feedback path between generation of stimulus, introducing stimulus into a system and analyzing the response of the system. This closed loop may run during creation of the network and/or regular operations of the network.

Figure 5:
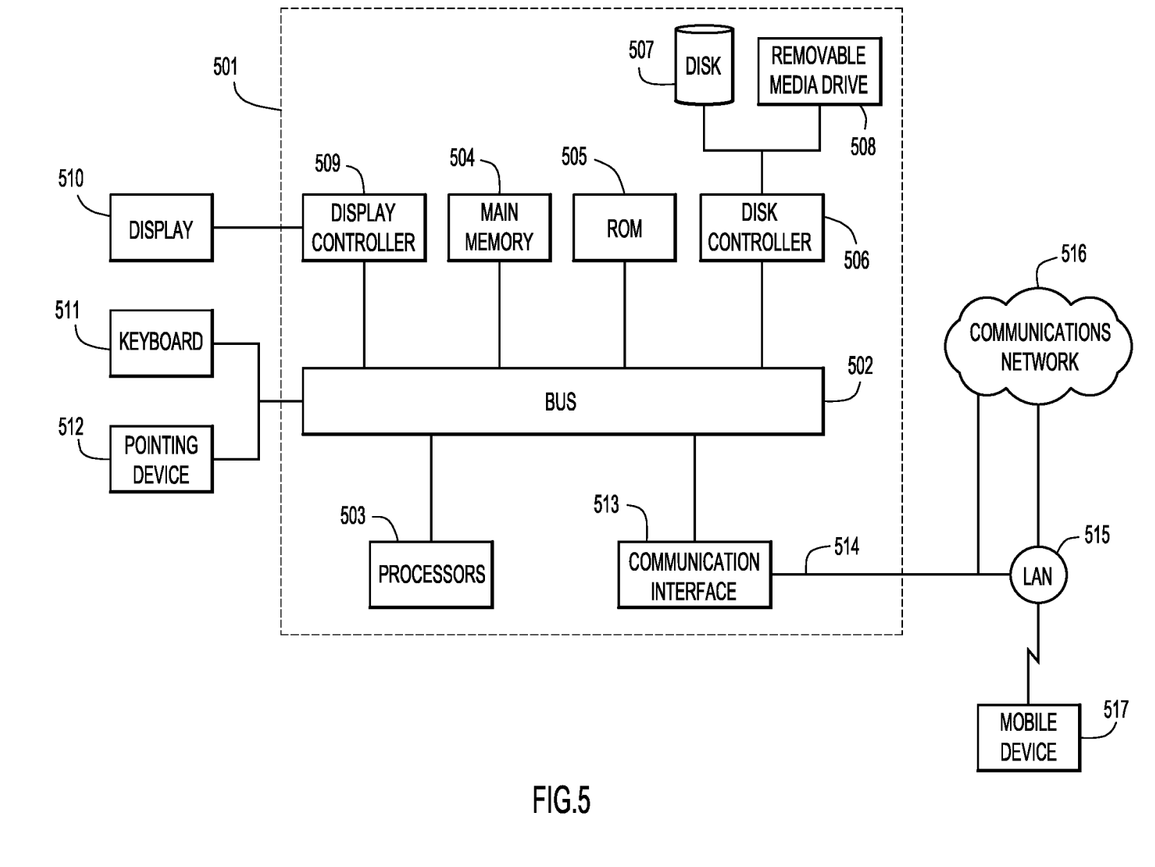
FIG. 5 is a block diagram depicting a computer system upon which the techniques presented herein may be implemented, according to an example embodiment.

Now referring to FIG. 5 for a description of a network element 501 upon which the server systems, network devices in a network, and other computing/network elements presented herein may be implemented (i.e., in FIG. 1). The network element 501 includes a bus 502 or other communication mechanism for communicating information, and processors 503 coupled with the bus 502 for processing the information. While the figure shows a single block 503 for a processor, it should be understood that the processors 503 represent a plurality of processing cores, each of which can perform separate processing. The network element 501 also includes a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions to be executed by processor 503. In addition, the main memory 504 may be used for storing temporary variables or other intermediate information during the execution of instructions by the processors 503.

The network element 501 further includes a read only memory (ROM) 505 or other static storage device (e.g., programmable ROM (PROM), erasable PROM (EPROM), Flash memory, and electrically erasable PROM (EEPROM)) coupled to the bus 502 for storing static information and instructions for the processors 503.

The network element 501 also includes a disk controller 506 coupled to the bus 502 to control one or more storage devices for storing information and instructions, such as a magnetic hard disk or solid-state disk 507, and a removable media drive 508 (e.g., floppy disk drive, read-only compact disc drive, read/write compact disc drive, tape drive, USB memory stick, and removable magneto-optical drive, optical drive). The storage devices may be added to the network element 501 using an appropriate device interface (e.g., small computer system interface (SCSI), integrated device electronics (IDE), enhanced-IDE (E-IDE), universal serial bus (USB), direct memory access (DMA), or ultra-DMA).

The network element 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors, graphics processing units (GPUs), and digital signal processors may individually, or collectively, are types of processing circuitry. The processing circuitry may be located in one device or distributed across multiple devices.

The network element 501 may also include a display controller 409 coupled to the bus 502 to control a display 510, such as liquid crystal display (LCD), or a light emitting diode (LED) display, for displaying information to a computer user. The network element 501 includes input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. The pointing device 512 may also be incorporated into the display device as, for example, a capacitive touchscreen and/or a resistive touchscreen.

The network element 501 performs a portion or all of the processing steps of the invention in response to the processor 503 executing one or more sequences of one or more instructions contained in a memory, such as the main memory 504. Such instructions may be read into the main memory 504 from another computer readable medium, such as a disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the network element 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the network element 501, for driving a device or devices for implementing the invention, and for enabling the network element 501 to interact with a human user (e.g., system administrators). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost. Generally, the computer code devices may store algorithms associated with the techniques presented herein (i.e., algorithms described in connection with FIGS. 2-4) so that the algorithms may be executed on processors 503.

The network element 501 also includes a communication interface 513 coupled to the bus 502. The communication interface 513 provides a two-way data communication coupling to a network link 514 that is connected to, for example, a local area network (LAN) 515, or to another communications network 516 such as the Internet. For example, the communication interface 513 may be a wired or wireless network interface card to attach to any packet switched (wired or wireless) LAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network link 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the network element 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The network element 501 can transmit and receive data, including program code, through the network(s) 515 and 516, the network link 514 and the communication interface 513. Moreover, the network link 514 may provide a connection through a LAN 515 to a mobile device 517 such as a personal digital assistant (PDA) laptop computer, or cellular telephone.

To summarize, in one form, a method is provided comprising: receiving, at a network device that is associated with a network or system, analytics data that provides an indication of how the network or system is responding to a set of test stimuli introduced into the network or system to facilitate an analysis operation; analyzing the analytics data based on an intended objective for the analysis operation; and generating, based on the analyzing, control settings for controlling creation of a subsequent stimulus to be introduced into the network or system during subsequent execution of the analysis operation.

In another form, a system is provided comprising: an analytics subsystem associated with a network or system that: analyzes responses of the network or system to a set of test stimuli introduced into the network or system to facilitate an analysis operation; and generates analytics data based on the analysis; and a stimulitics subsystem associated with the network that: receives the analytics data from at least the analytics subsystem; analyzes the analytics data based on an intended objective for the analysis operation; and generates, based on the analyzing, control settings for controlling creation of a subsequent stimulus to be introduced into the network or system during subsequent execution of the analysis operation.

In yet another form, one or more non-transitory computer-readable storage media is provided encoded with software comprising computer executable instructions and when the software is executed operable to: receive analytics data that provides an indication of how a network or system is responding to a set of stimuli introduced into the network or system to facilitate an analysis operation; analyze the analytics data based on an intended objective for the analysis operation; and generate, based on the analyzing, control settings for controlling creation of a subsequent stimulus to be introduced into the network or system during subsequent execution of the analysis operation.

A number of advantages are achieved via the methods, system, and computer readable media described herein. Generally, the techniques presented herein will greatly increase the efficiency, performance, immediacy, and thoroughness of large scale system testing, thereby saving labor and increasing the trustworthiness of complex networks and systems. More specifically, the techniques presented herein may automate stimuli generation and, thus eliminate or significantly reduce the burden associated with generating stimuli. Additionally, the techniques allow testing systems to dynamically adapt, in near real-time, to changing network/system conditions, which, among other advantages, may allow the testing systems to react to new security threats, performance requirements, application suites, etc. As still another examples, the closed loop created by the techniques presented herein may enrich test scenarios while applying machine learning to the test stimuli creation may integrate knowledge from similar scenarios into the prioritization and building of test cases for the enriched test scenarios.

Moreover, and also advantageously, the techniques presented herein can be used for a variety of analysis operations, including network commissioning, load testing, routine exercise, troubleshooting, security certification, etc. Similarly, the techniques presented herein may be suitable for a variety of networks or systems, including complex IoT networks, complex industrial control systems, smart transportation systems (i.e., the techniques presented herein may be used for debugging autonomous driving), avionics (i.e., the techniques presented herein may be used for troubleshooting complex control systems) and cyber warfare (i.e., the techniques presented herein may be used for finding root causes of intrusions and countermeasures). In fact, over time, the adaptive stimuli generation provided herein (and effectuated by machine learning techniques) may approach 100% classical test coverage for hardware and software for any of these networks or systems.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

What is claimed is:

1. A method comprising:
    receiving, at a network device that is associated with a network, first analytics data that provides an indication of how the network is responding to a first stimulus introduced into the network to facilitate a first analysis operation;
    analyzing the first analytics data based on an intended objective for the first analysis operation;
    generating, based on the analyzing the first analytics data, control settings for controlling creation of a second stimulus to be introduced into the network during execution of a second analysis operation;
    causing a device, based on the control settings, to introduce the second stimulus to the network;
    receiving, at the network device that is associated with the network, second analytics data that provides an indication of how the network is responding to the second stimulus introduced into the network to facilitate the second analysis operation; and
    analyzing the second analytics data based on an intended objective for the second analysis operation.

2. The method of claim 1, further comprising:
    transmitting the control settings to the device.

3. The method of claim 2, further comprising:
    transmitting the control settings to an analytics system to cause the analytics system to generate the second analytics data based on the second stimulus introduced into to the network.

4. The method of claim 3, wherein the analyzing the first analytics data employs machine learning techniques,
    wherein analyzing the second analytics data employs the machine learning techniques based on the intended objective for the second analysis operation or a modified objective determined by the machine learning techniques; and the method further comprises:
    generating, based on the analyzing of the second analytics data, at least one of: (a) subsequent control settings for controlling creation of the second stimulus to be introduced into the network; or (b) a new prioritization of the second stimulus to be introduced into the network.

5. The method of claim 1, wherein the first analytics data comprises:
    feedback data from an analytics system associated with the network; and
    feedback data from an analytics machine learning system associated with the analytics system.

6. The method of claim 5, further comprises:
    transmitting the control settings to the analytics machine learning system to update analytics machine learning techniques applied by the analytics machine learning system.

7. The method of claim 1, wherein the receiving the first analytics data, the analyzing the first analytics data, and the generating are completed automatically during at least one of: (a) creation of the network; (b) regular operations of the network; or (c) abnormal operations of the network.

8. A system comprising:
    one or more memories; and one or more processors, wherein the one or more processors are configured to execute:

an analytics subsystem associated with a network and a stimulitics subsystem associated with the network; and wherein the one or more processors are configured to execute the analytics subsystem and the stimulitics subsystem by:

receiving, at the analytics subsystem from the one or more memories, first analytics data that provides an indication of how the network is responding to a first stimulus introduced into the network to facilitate a first analysis operation;

analyzing, at the analytics subsystem, the first analytics data based on an intended objective for the first analysis operation;

generating, at the stimulitics subsystem based on the analyzing the first analytics data, control settings for controlling creation of a second stimulus to be introduced into the network during execution of a second analysis operation;

receiving, at the analytics subsystem, second analytics data that provides an indication of how the network is responding to the second stimulus introduced into the network to facilitate the second analysis operation; and analyzing, at the analytics subsystem, the second analytics data based on an intended objective for the second analysis operation.

9. The system of claim 8, wherein the one or-more processors are configured to execute a stimulus generation subsystem associated with the network, wherein the one or more processors are configured to execute the stimulitics subsystem by:

transmitting the control settings to the stimulus generation subsystem to cause the stimulus generation subsystem to introduce the second stimulus into the network.

10. The system of claim 9, wherein the one or more processors are further configured to execute the stimulitics subsystem by:

transmitting the control settings to the analytics subsystem to cause the analytics subsystem to generate the second analytics data based on the second stimulus introduced into the network.

11. The system of claim 10, wherein the one or more processors are further configured to execute the stimulitics subsystem by:

employing machine learning techniques;

analyzing the second analytics data with the machine learning techniques based on the intended objective for the second analysis operation or a modified objective determined by the machine learning techniques; and generating, based on the analyzing of the second analytics data, at least one of: (a) subsequent control settings for controlling creation of the second stimulus to be introduced into the network; or (b) a new prioritization of the second stimulus to be introduced into the network.

12. The system of claim 8, wherein the one or more processors are further configured to execute an analytics machine learning subsystem associated with the analytics subsystem, wherein the one or more processors are further configured to execute the stimulitics subsystem by: receiving the first analytics data from the analytics subsystem and the analytics machine learning subsystem.

13. The system of claim 12, wherein the one or more processors are further configured to execute the stimulitics subsystem by:

transmitting the control settings to the analytics machine learning subsystem to update analytical machine learning techniques applied by the analytics machine learning subsystem.

14. The system of claim 10, wherein the system operates automatically during at least one of: (a) creation of the network; (b) regular operations of the network; or (c) abnormal operations of the network.

15. One or more non-transitory computer readable storage media encoded with software comprising computer executable instructions and when the software is executed operable to:

receive first analytics data that provides an indication of how a network is responding to a first stimulus introduced into the network to facilitate a first analysis operation;

analyze the first analytics data based on an intended objective for the first analysis operation; and generate, based on the analyzing the first analytics data, control settings for controlling creation of a second stimulus to be introduced into the network during execution of a second analysis operation;

cause a device, based on the control settings, to introduce the second stimulus to the network;

receive second analytics data that provides an indication of how the network is responding to the second stimulus introduced into the network to facilitate a second analysis operation; and analyze the second analytics data based on an intended objective for the second analysis operation.

16. The one or more non-transitory computer readable storage media of claim 15, further comprising instructions operable to:

transmit the control settings to a device configured to introduce the second stimulus into the network.

17. The one or more non-transitory computer readable storage media of claim 16, further comprising instructions operable to:

transmit the control settings to an analytics system to cause the analytics system to generate the second analytics data based on the second stimulus introduced into to the network.

18. The one or more non-transitory computer readable storage media of claim 17, wherein the instructions to analyze employ machine learning techniques and the instructions further comprising instructions operable to:

analyze the second analytics data with the machine learning techniques based on the intended objective for the second analysis operation or a modified objective determined by the machine learning techniques; and generate, based on the analyzing of the second analytics data, at least one of: (a) subsequent control settings for controlling creation of the second stimulus to be introduced into the network; or (b) a new prioritization of the second stimulus to be introduced into the network.

19. The one or more non-transitory computer readable storage media of claim 15, wherein the first analytics data comprises:

feedback data from an analytics system associated with the network; and feedback data from an analytics machine learning system associated with the analytics system.

20. The one or more non-transitory computer readable storage media of claim 15, wherein the instructions are executed automatically during at least one of: (a) creation of the network; (b) regular operations of the network; or (c) abnormal operations of the network.

\* \* \* \* \*